July 30, 1946.　　　P. SCHLUMBOHM　　　2,404,890
COMPRESSOR
Filed Nov. 25, 1944　　　2 Sheets-Sheet 1

Witness:
P. Edgar Wilson

INVENTOR.
Peter Schlumbohm

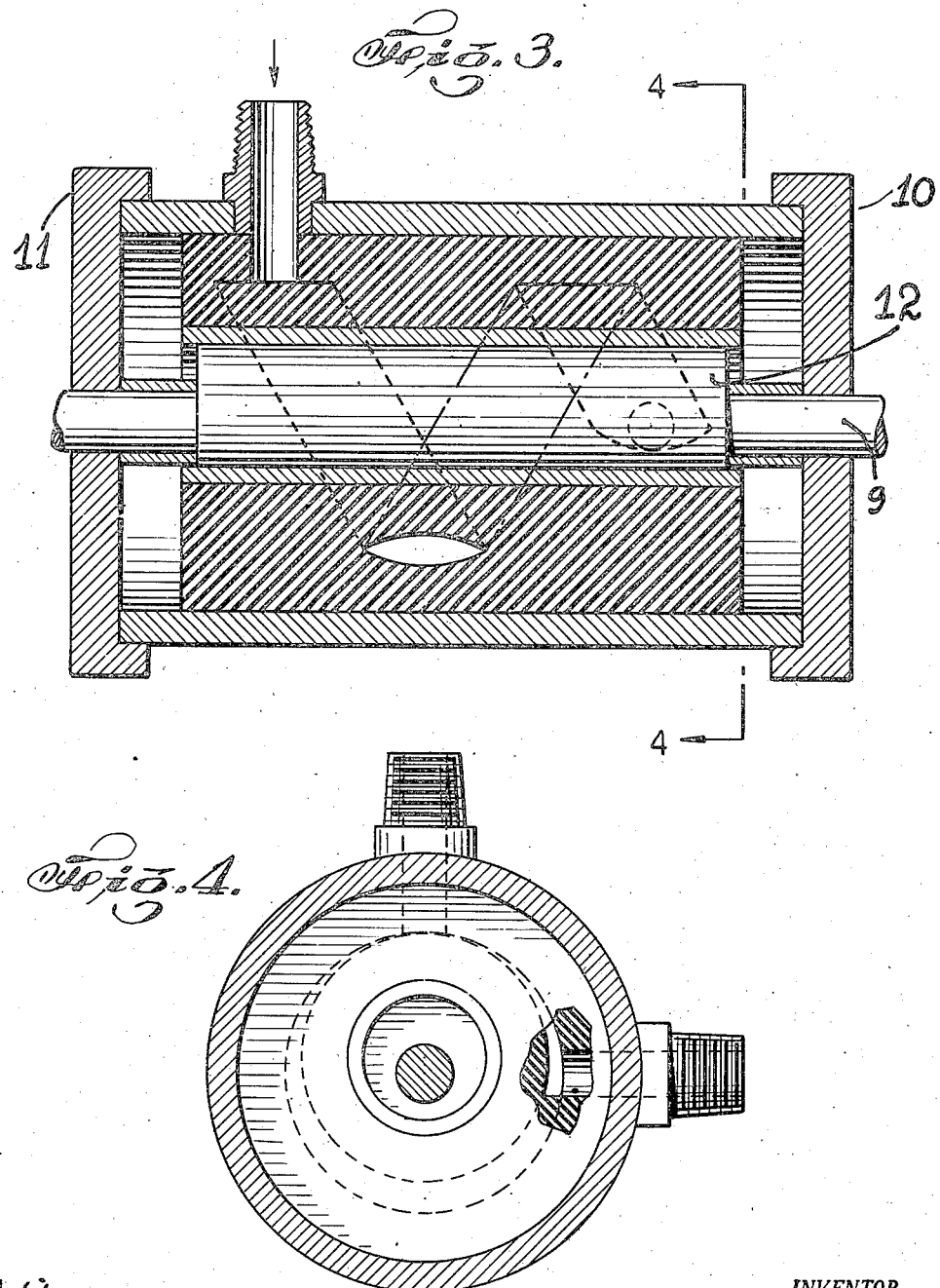

Patented July 30, 1946

2,404,890

UNITED STATES PATENT OFFICE 2,404,890

COMPRESSOR

Peter Schlumbohm, New York, N. Y.

Application November 25, 1944, Serial No. 565,089

7 Claims. (Cl. 103—149)

The invention relates to an apparatus which is primarily designed to be a compressor, but which may also serve as a pump or even as a motor. To simplify the language, I shall speak in the following description of a compressor only.

Figure 1:
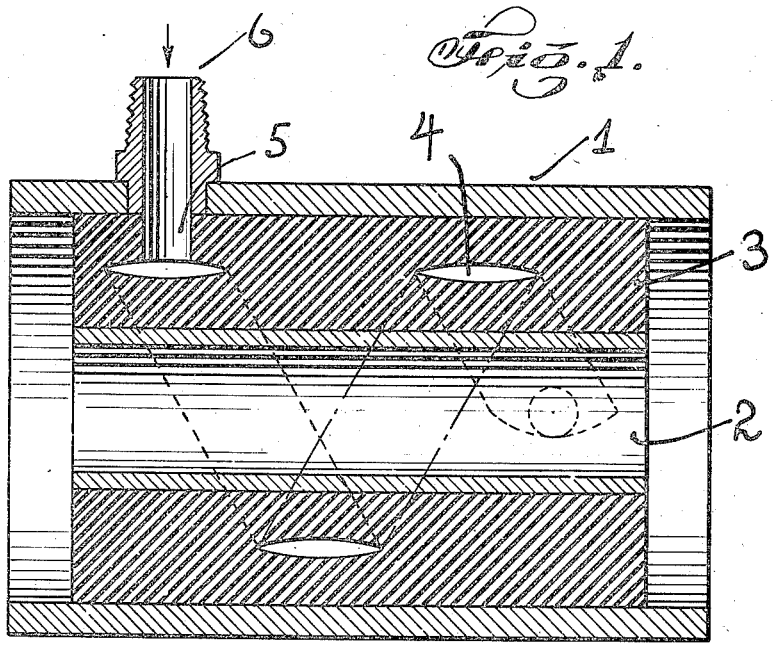
Figure 2:
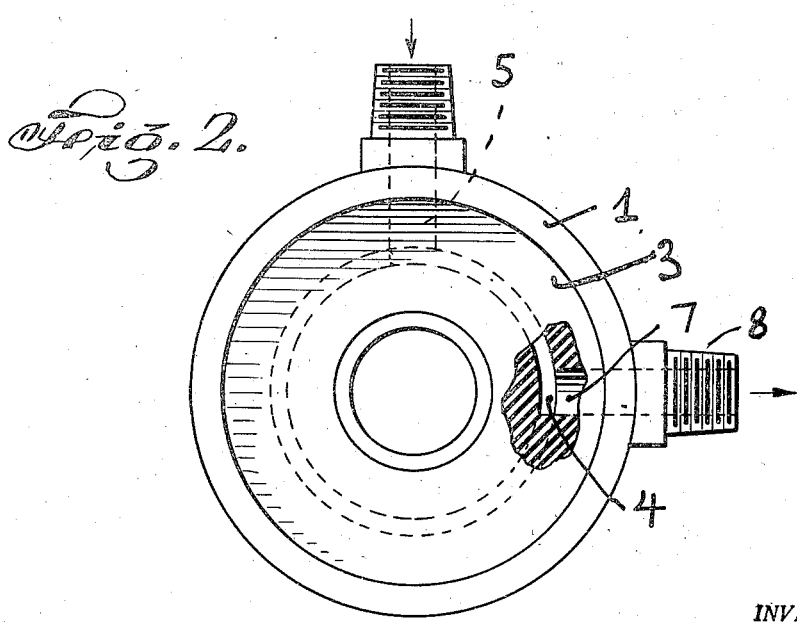

The invention is illustrated, by way of example, in Fig. 1 to Fig. 4 of the accompanying drawings. Fig. 1 and Fig. 2 show the compressor without its shaft. Figs. 3 and 4 show the compressor with the shaft inserted. Fig. 1 is a vertical section. Fig. 2 is a side view of Fig. 1, with a part broken away. Fig. 3 is shown in the same section as Fig. 1. Fig. 4 is a section along 4—4 of Fig. 3 and otherwise corresponds to Fig. 2.

The invention applies the principle of the "roller compressor" to the "hose pump."

The roller-compressor is well known and does not need explanation. Milking a cow is the simplest example of the hose-pump principle.

The invention is:

To arrange the hose in a spiral path around the rolling piston, coaxially with the driving shaft;

To secure a firm grip on the walls of the flexible hose by tying them, e. g. by vulcanization, to a rigid body, in this example the tube 2, which follows the pressure of the excentric piston 12, and which thus will alternatingly pull at those walls or press against them;

To supplement this inside-grip on the flexible walls of the hose by an outside grip in the form of a tie between the walls of the hose and the cylinder-casing, in this example the tube 1, which is concentrical with the driving shaft 9;

To form the hose as a spiral free path embedded in the mass of a piece of rubber, which much like in rubber bearings, surrounds a metal tube and is itself again surrounded by an outer metal tube, bonded to both the inner and the outer tube by vulcanization;

To limit the length of the spiral path to just slightly more than one full turn, e. g. one and a quarter turns, as shown in the drawings; recognizing, that additional length would only mean dead space and dead weight; recognizing, that— in the language of roller-compressors—the excentric piston rolls over the inlet prior to rolling over the outlet, and that the important feature is already to make the circumferential way for the compressed fluid exceed $2\pi r$ between the inlet and the outlet, and that this will secure always a seal at some point of the circumference between the inlet and the outlet;

To build this rubber-bearing-like structure as an interchangeable spare part, so that if the rubber wears out, the compressor is easily serviced by replacing just this part;

To build the outer tubing of this rubber-bearing-like structure with an outer tubing adapted to cooperate with the bearings of the driving shaft, e. g. as shown in the drawings by extending the length of that outer tubing over the length of the rubber mass 3 and to fit the bearing caps 10 and 11 of the driving shaft 9 to that outer tube 1 as supporting and as centering means;

To equip the outer tube 1 with pipe fittings for the suction and pressure line respectively, and to provide within said rubber mass 3 channels which lead from the ends of the spiral path to said inlet and outlet fittings respectively.

The operation of the device is evident from the drawings. As shown in Figs. 1 and 2, the manufactured part with the spiral path 4 shows even dimensions of that channel throughout its spiral way. When the excentric piston is inserted as shown in Figs. 3 and 4, the channels at the excenter side are closed, while diametrically opposite the rubber mass 3 is stretched due to the pull of tube 2 and accordingly the dimensions of the channel 4 in that zone are enlarged in that phase.

This stretch, on the other hand, is made possible only by the firm bond between the rubber mass 3 and the outer tube 1. In the broadest sense, the invention is: bonding the opposite walls of a compression space forming flexible hose to rigid elements, moving these rigid elements to and fro and thereby decreasing or increasing, respectively, the compression space between the flexible walls. Due to the firm bond, the pulsations do not depend on the resiliency of the material of the flexible walls. This gives wide choice in the R. P. M. for the shaft, and a compressor of this type may be directly coupled with a high R. P. M. motor. In certain cases it will be advantageous to synchronize the frequency of resonance of the rubber mass 3 with the frequency of the excenter 12, and to design the rubber mass accordingly.

The general advantages of the new compressor are to avoid stuffing box, oiling means and valves. Its drawback seems to be, at first sight, its small volumetric capacity. However, there is a ready market for miniature compressors in the field of portable refrigeration condensing units. The elimination of valves is a special advantage in small compressors, as cylinder clearance means in percentage more in a small than in a large cylinder volume. Such apparatus with perfect cylinder clearance will also have merit as vacuum pump.

High R. P. M. can compensate the small cylinder volume and the new compressor is very suitable for high R. P. M.

All the advantages of a rubber bearing tie in with the above advantages of the compressor design. Noiseless operation and easy alignment with the motor are the more important the higher the R. P. M.

In the example shown, the cross section of the compression space 4 (Fig. 1) is that of a very flat ellipse. While this is the optimal shape for the pumping action, moulding facilities may lead to other shapes.

Side-shields (not shown) may be provided to support the side walls of the rubber mass 3 against excessive pressure in space 4. Such support may be formed e. g. by an outward flange on tube 2, or by washers, or by protrusions from caps 10 and 11.

The device, like other compressors, may be used as a motor by introducing compressed air, letting the air expand in the spiral path and thereby rotating shaft 9.

Being substantially a rubber-bearing, the device may be used in many cases both for the function of being a bearing and for the function of pumping. For instance, if the shaft 9 is a driving shaft between a motor and a driven means, e. g. a propeller, and if the bearing has e. g. the purpose of providing a seal around the shaft, the device as shown will serve the sealing purpose and will in addition serve as pumping means.

Having now described my invention and having given examples of the manner in which it may be performed, I claim:

1. A compressor comprising a driving shaft, an excenter section on said driving shaft; a first rigid tubular element surrounding said excenter section; a second, wider rigid tubular element arranged concentrically to the driving shaft; a rubber mass encased between said two tubular elements and bonded to the contacted walls along the entire length of contact; means to hold the driving shaft concentrically to said second tubular element; cavities in said rubber mass forming a spiral path for the fluid to be pumped, said spiral being coaxial with the driving shaft; inlet- and outlet-openings in the wall of said second tubular element; additional cavities in said rubber mass to connect the ends of said spiral path with said inlet- and outlet-openings, respectively.

2. A compressor as claimed in claim 1, the length of said spiral being limited to one full turn plus a fraction of a second turn.

3. A high speed rotary compressor comprising an outer rigid sleeve, an inner rigid sleeve, a rotor comprising an excenter mounted on a rotatable driving shaft and positioned within said inner sleeve, the space between said outer sleeve and said inner sleeve comprising a mass of elastic material provided with a compression chamber having inlet and outlet openings, the walls of said elastic material being integrally bonded to said outer sleeve and said inner sleeve along the entire length of contact.

4. A high speed rotary compressor comprising an outer rigid sleeve, an inner rigid sleeve, a rotor comprising an excenter mounted on a rotatable driving shaft and positioned within said inner sleeve, the space between said outer sleeve and said inner sleeve comprising a mass of rubber provided with a compression chamber having inlet and outlet openings, the wall of said rubber being integrally bonded to said outer sleeve and said inner sleeve along the entire length of contact.

5. A rotary compressor according to claim 4 having a compression chamber consisting of a spirally shaped tubular cavity within a compressible mass of material, wherein the length of the spiral is limited to one full turn plus a fraction of a second turn.

6. A rotary compressor comprising an outer rigid sleeve, an inner rigid sleeve, a rotor comprising an excenter mounted on a rotatable driving shaft rotating within bearings cooperating with said outer rigid sleeve, the space between said outer sleeve and said inner sleeve comprising a mass of elastic material provided with a compression chamber having inlet and outlet openings, the walls of said elastic material being integrally bonded to said outer sleeve and said inner sleeve along the entire length of contact.

7. In a rotary compressor a separable compressor element consisting of a mass of compressible material shaped to form a ring cylinder and provided with a compression chamber having inlet and outlet openings, an outer tubular rigid sleeve and an inner tubular rigid sleeve, wherein the outer wall of said cylindrical compressible material is bonded to the inner wall of said outer tubular sleeve along the entire length of contact and the inner wall of said cylindrical compressible material is bonded to the outer wall of said inner tubular sleeve along the entire length of contact.

PETER SCHLUMBOHM.